A. WIETING.
Grain Drill.

No. 8,018.  Patented Apr. 1, 1851.

UNITED STATES PATENT OFFICE.

A. WIETING, OF MIDDLETOWN, PENNSYLVANIA.

IMPROVEMENT IN SEED-PLANTERS.

Specification forming part of Letters Patent No. 8,018, dated April 1, 1851.

*To all whom it may concern:*

Be it known that I, ARCHIBALD WIETING, of Middletown, in the county of Dauphin and State of Pennsylvania, have invented certain new and useful Improvements on Seeding-Machines; and I do hereby declare the following to be a full and clear description thereof, reference being had to the drawings hereunto annexed, which illustrate the same and constitute part of this specification.

Figure 1:
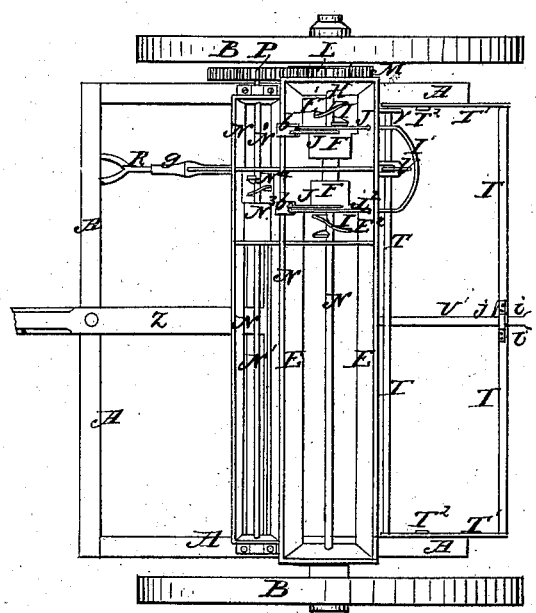
Figure 2:
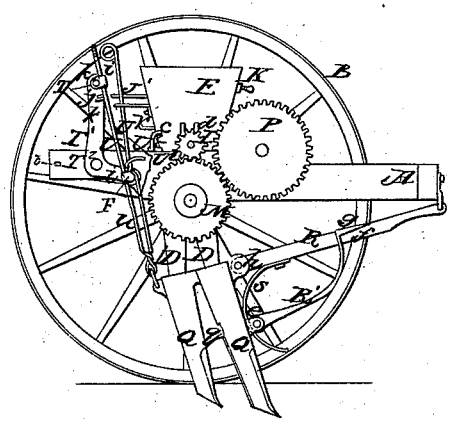
Figure 3:
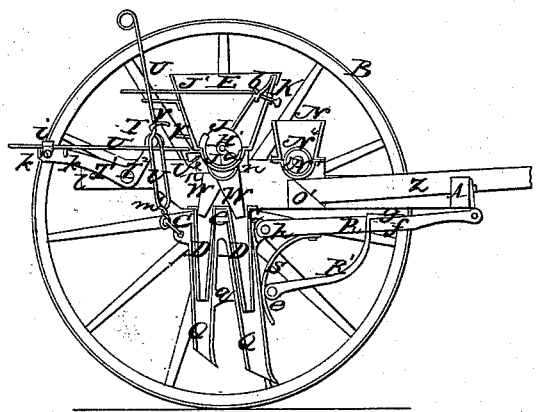
Figure 4:
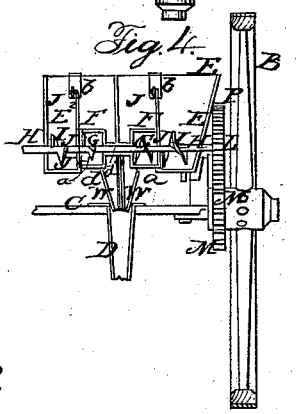
Figures 5, 8:
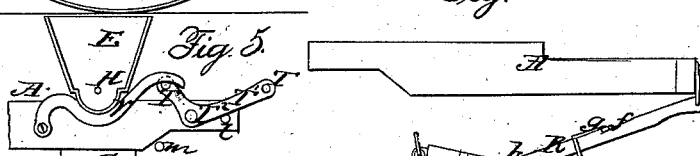
Figure 6:
Figure 7:
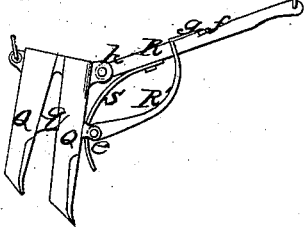

Figure 1 represents a plan or top view of the machine, showing only one manure and one grain section of the hopper and a section of the grass-seed sower. Fig. 2 is an end elevation, the drill-teeth or depositing-tubes being lowered in a position for operation and the pinion on the shaft of the grain-hopper engaged with the cog-wheel of the propelling-wheel. Fig. 3 is a vertical transverse section, showing the drill-teeth or depositing-tubes elevated. Fig. 4 is a vertical longitudinal section through a portion of the hopper, screw-shaft, funnel-shaped tubes, &c. Fig. 5 is a sectional view, showing the lever for disengaging the grain-hopper simultaneously with the ascent of the drill-teeth. Fig. 6 is a transverse section through the grass-seed hopper, showing the perforated slide. Fig. 7 is a longitudinal section of the same. Fig. 8 is an elevation of one of the combined drill-teeth, drag-bar, and beam of the frame, showing the position of the drill-teeth when struck by a rock or other obstruction, and also the spring-brace.

The same letters marked on the above figures indicate the same parts where they occur.

The nature of my improvements consists, first, in constructing each section of the hopper in which the seed and manure are placed in such a manner as to receive sections of screws formed around the main transverse shaft, and inclosing a portion thereof with a case or circular box, into which the grain and manure are fed, the feeding being effected by spiral blades or flanges revolving uncovered in the concave bottom of the hopper, the end of each box or case having an opening therein provided with segmental valves made to move or turn (the transverse shaft being their axis) by means of a bent rod connecting the same, and is for the purpose of regulating the feed of the grain and manure by increasing or diminishing size of the entrance-openings therein at pleasure; secondly, in combining a separate hopper and screw-shaft in front of and parallel to the main hopper for receiving and sowing or scattering clover and grass seed in advance of the drill-teeth, said screw-shaft being provided with circular boxes or cases having openings in each end and a horizontal perforated slide-valve at one end to regulate the sowing or scattering of the seed between the furrows, which will be covered by the drill-teeth; thirdly, in the employment of two or more drill-teeth or depositing-tubes arranged in a direct line, one behind the other, and attached to and drawn by the same drag-bar, the front one being longest, for the purpose of depositing fine manure or chemical agents an inch or two beneath the grain when deposited by the succeeding drill-tooth; fourthly, in the manner of combining a curved spring-brace with the front drill-tooth and drag-bar, so that when the drill-tooth shall strike against a rock or other obstruction, the outer or curved end of the spring-brace will be made to yield or approximate to a straight line and disengage its end from a notch on the drag-bar and slip over the same, and thus allow the drill-tooth to recede or turn upon the bolt connecting it with the drag-bar, and prevent the tooth being broken, the spring-brace and drill-tooth being returned to the proper position, after being relieved from the obstruction by means of a spring; fifthly, my improvements consist in the peculiar arrangement and construction of a turning lever-frame having its fulcrum in the side beams of the frame for the purpose of lifting all the drill-teeth at the same time and holding them in that position till required to be lowered by means of a holding slide-bar, whose inner end is made to catch over a rest or cam projecting from the seed-hopper, the drill-teeth or depositing-tubes being attached to the lever-frame by means of open wire rods, by which any one of the drill-teeth can be raised and suspended to a rest attached to the hopper; and, lastly, my improvements relate to the employment of two funnel-shaped tubes attached or suspended to the bottom of the hopper in such a manner as to communicate with the openings in each case or box in which the screws revolve, and receive and discharge the manure and grain into the combined trill-teeth; or they may be turned so as to direct the grain and manure into the same drill-tooth.

A is the frame; B B, the supporting and propelling wheels, turning on short axles secured to a horizontal transverse timber, C, to which is secured the usual flexible tubes, D, projecting into the drill-teeth.

E is the hopper, in which the grain and manure apartments are formed by division-boards, E' being the manure-apartments and E² the grain-apartments. The bottom of each apartment is made concave, and each having a portion closed in the form of a box or case, F, having openings $a\ a'$ in each end, and in each of which rotates a section of a screw, G, formed around the horizontal transverse shaft H, which extends the entire length of the hopper and in the center thereof. Adjacent to the circular cases F are made to rotate spiral blades or flanges I, affixed to the shaft H in such a manner as to insure a constant and regular feed of the grain and manure simultaneously through the openings $a\ a$ in the ends of the circular cases F, to be discharged by the screws G through the opposite openings, $a'\ a'$, therein into funnel-shaped tubes, and thence into the combined depositing-tubes. Each case or box of the apartments of the hopper is provided with segmental valves J, confined in grooves adjacent to the feed-openings $a$, the transverse shaft serving as their axis, and connected by a bent hand-wire, J', projecting outward through openings in the hopper, by which they are moved or turned simultaneously to open and close the openings through which the manure and grain are fed.

K are set-screws screwed into the front side of the hopper against spring-plates $b\ b$, attached thereto for the purpose of governing the forward movement of the curved hand-wire J', and consequently the movement of the segmental valves J, and thus regulate the feeding of the grain and manure, according to the quantity to be sown per acre, and by which the sowing of the grain may be checked entirely, if desired.

The hopper E is hinged at one end to the side timber of the frame, and its opposite end is permitted to rise and fall with the motion of the lifting-lever to disengage and engage the pinion L on the end of the transverse shaft H with the cog-wheel M on the short axle of the supporting-wheel B, and thus stop and start the planting of the grain and manure, the end of the hopper being prevented from rising too high by a hook or staple, $c$, and secured from lateral movement by a plate, $d$, projecting from the beam on either side of the transverse shaft, the bearings of said shaft being in either end of the hopper.

N is a small hopper, arranged immediately in front and parallel to the grain and manure hopper E, and divided into as many apartments as required, and designed to receive and sow clover and grass seeds in connection with the grain, and provided with a shaft, N', turning in bearings in said hopper N, having formed thereon sections of screws N², revolving in circular cases N³, which form a portion of the bottom of each apartment, and also spiral blades or flanges N⁴ for feeding the clover and grass seeds through openings in said cases, to be discharged through openings at their opposite ends, which are provided with transverse perforated slides O, the perforations being of unequal sizes, and, when made to coincide with the opening in the end of the case, permit and regulate the discharge of the seed as desired and according to the nature of the soil, said perforated slides O being held against the end of the case by plates, between which it is permitted to move, the seed being scattered by the inclined timber O', upon which it falls, as seen in Fig. 3.

P is a large cog-wheel on the end of the shaft of the grass-sower, made to match with the cog-wheel M on the short axle of the propelling-wheel B, by which the rotation of the grass and grain sower is produced simultaneously, and the grass-seed, being sown between each furrow, will be covered by the soil raised by the drill-teeth, and prevented from falling or being washed into the grooves with the grain.

Q are the combined drill-teeth and depositing-tubes, secured firmly together at their upper ends, and near the middle thereof, by a connecting-plate, $q$, the front drill-tooth being longer than the rear tooth by about two or three inches, for the purpose of depositing the fertilizing substance beneath the grain which is deposited by the rear or short depositing-tube, their lower ends being distant from each other about one foot.

R represents one of the drag-bars, attached to the front beam of the frame and upper portion of the drill-tooth in the usual manner.

In order to prevent the combined drill-teeth being broken or injured by striking against stones or other obstructions, I attach to the front drill-tooth, and near the middle of its length, by two projecting ears, $e\ e$, the end of a spring-brace, R', which extends outward and upward in a curved form, and provided with an opening or slot, through which the drag-bar passes, the upper end of said spring-brace being extended horizontally, or nearly at right angles with its upper end, about one or two inches, and fitting into a notch, $f$, formed on the upper edge of the drag-bar R and against a shoulder, the notch $f$ tapering from the shoulder upward and frontward, and the under side of the horizontal portion of the spring-brace being tapered to a point, $g$, and fitting nicely into the notch, the spring-brace R' being reduced in size at its curved portion for imparting to it a certain degree of elasticity. Thus it will be seen that when the points of the combined drill-teeth meet with obstructions while the machine is in progress, the pressure against the drill-teeth will cause the spring-brace R' to approximate to a straight line and raise its end from the shoulder of the notch $f$, while the point of its end $g$ is made to rest upon the drag-bar, when it will be instantly relieved and the drill-teeth permitted to turn on the connecting-bolt $h$ and their lower ends recede.

from the obstruction. The spring-brace R', and the drill-teeth are returned to their proper position by means of a spring, S, attached to the under side of the drag-bar R, and passes through the ears $e$ projecting from the drill-tooth.

The lever-frame is composed of two horizontal parallel rods, T T, connected at their ends by two bent or L-shaped plates, T' T', secured to the insides of the side beams of the frame by bolts $T^2$, which serve as the fulcra of said lever-frame. To the inner rod T are connected the drill-teeth by open wire rods U, provided with hooks X for catching over plates Y and holding any one of the same in an elevated position, through which rods U the said inner rod of the lever-frame passes, the wire rods U being attached to the drill teeth or tubes, and by which they are raised simultaneously and held in an elevated position by a spring sliding bar, U', attached to the center of the horizontal rods T by loops $i$ $i$, and permitted to move back and forth for catching over a cam or holding plate, $U^2$, projecting from the hopper near its bottom, by bearing down the outer end of the lever-frame until the inner end of the spring sliding bar, U', strikes the cam-plate $U^2$ and rises over and above the same, and is forced inward by a spring, $j$, attached to the outer rod T and bearing against a pin, $k$, on the slide-bar U', the movement of said slide-bar being governed by two pins, $k$ $k$, projecting therefrom on either side of the outer rod, and disengaged from the cam-holding plate $U^2$ by the operator simply laying hold of its outer end and drawing it outward. The descent of the outer end of the turning lever-frame is limited by pins $l$, projecting from the side beams of the frame, against which the long arms of the L-shaped plates strike; and the descent of its inner end is limited by hooks $m$, Fig. 5, also projecting from the beams of the frame.

V is a curved lever, having one end attached to the side beam of the frame and extending rearward beneath the end of the hopper over the inner rod of the lever-frame, so that simultaneously with the ascent of the inner end of said lever and drill-teeth, the end of the curved lever V will be raised and with it the end of the hopper E, and thus disengage the pinion L on the end of the screw-shaft H from the cog-wheel M of the propelling-wheel B, and stop the rotation of the screw-shaft, the pinion L being engaged with the cog-wheel on the descent of the inner end of the turning lever-frame and drill-teeth.

W are the funnel-shaped tubes attached to either side of a plate, $n$, projecting from the under side of the hopper between the ends of the screw-boxes F, by bolts upon which they are permitted to turn. The adjacent sides of these funnel-shaped tubes W are flat, and so arranged as to direct the grain and manure into the combined drill-teeth, but may be changed to direct the grain and manure together into the same depositing-tube, should it be desired.

The machine is drawn forward by the beasts of draft attached to the tongue $z$ in the usual manner.

Having thus described the nature of my invention and improvement and the operation of the same, what I claim as new and of my own invention, is—

Placing two or more hollow drill-teeth in a direct line, one behind the other, managed and drawn by the same drag-bar, the front tooth being made the longest and so placed as to run somewhat deeper in the soil than its successor or follower, for the purpose of depositing fine manure or chemical agents beneath the grain, when planted in rows or otherwise, as herein fully set forth and represented.

In testimony whereof I have hereunto signed my name before two subscribing witnesses.

ARCHIBALD WIETING.

Witnesses:
WM. P. ELLIOT,
J. S. SMITH.